(12) United States Patent
Ishikawa et al.

(10) Patent No.: US 8,900,379 B2
(45) Date of Patent: Dec. 2, 2014

(54) STAINLESS STEEL FOR SOLID POLYMER FUEL CELL SEPARATOR AND SOLID POLYMER TYPE FUEL CELL USING THE STAINLESS STEEL

(75) Inventors: Shin Ishikawa, Chiba (JP); Kunio Fukuda, Chiba (JP); Yasushi Kato, Chiba (JP); Osamu Furukimi, Chiba (JP); Kenji Takao, Chiba (JP)

(73) Assignee: JFE Steel Corporation (JP)

( * ) Notice: Subject to any disclaimer, the term of this patent is extended or adjusted under 35 U.S.C. 154(b) by 2263 days.

(21) Appl. No.: 10/533,609

(22) PCT Filed: Jun. 9, 2004

(86) PCT No.: PCT/JP2004/008401
§ 371 (c)(1),
(2), (4) Date: May 11, 2005

(87) PCT Pub. No.: WO2005/035816
PCT Pub. Date: Apr. 21, 2005

(65) Prior Publication Data
US 2006/0105218 A1    May 18, 2006

(30) Foreign Application Priority Data
Oct. 7, 2003  (JP) .................. 2003-348772

(51) Int. Cl.
*C22C 38/18* (2006.01)
*C22C 38/22* (2006.01)
*C22C 38/02* (2006.01)
*C22C 38/04* (2006.01)
*C22C 38/26* (2006.01)
*H01M 8/02* (2006.01)
*H01M 8/10* (2006.01)

(52) U.S. Cl.
CPC ........ *C22C 38/22* (2013.01); *C22C 38/02* (2013.01); *C22C 38/04* (2013.01); *C22C 38/26* (2013.01); *H01M 8/0204* (2013.01); *H01M 8/021* (2013.01); *H01M 8/0228* (2013.01); *H01M 8/0254* (2013.01); *H01M 8/1002* (2013.01); *Y02E 60/521* (2013.01)
USPC ............. 148/325; 420/67; 148/326; 148/327; 429/492

(58) Field of Classification Search
USPC ........................................... 148/325
See application file for complete search history.

(56) References Cited

U.S. PATENT DOCUMENTS

| | | | |
|---|---|---|---|
| 6,379,476 B1* | 4/2002 | Tarutani et al. | 148/325 |
| 6,835,487 B2* | 12/2004 | Takao et al. | 429/34 |
| 2002/0160248 A1 | 10/2002 | Takao et al. | |
| 2003/0170526 A1 | 9/2003 | Hodgson et al. | |

FOREIGN PATENT DOCUMENTS

| | | |
|---|---|---|
| JP | 2002-270196 A | 9/2002 |
| JP | 2003-223904 A | 8/2003 |
| WO | WO 02-13300 A1 | 2/2002 |

\* cited by examiner

*Primary Examiner* — Jessee Roe
*Assistant Examiner* — Christopher Kessler
(74) *Attorney, Agent, or Firm* — DLA Piper LLP (US)

(57) ABSTRACT

Provided are a stainless steel for a proton-exchange membrane fuel cell separator having high durability and a low contact resistance (i.e., high electrical conductivity) and a proton-exchange membrane fuel cell using the same. More specifically, a stainless steel for a proton-exchange membrane fuel cell separator has a composition comprising 0.03% mass % or less of C, 16-45 mass % of Cr, 0.03 mass % or less of N, 0.1-5.0 mass % of Mo, wherein a total of the C content and the N content satisfies 0.03 mass % or less; a balance portion is comprised of Fe and unavoidable impurities; an atomic ratio of Cr/Fe with respect to Al, Cr, and Fe contained in a passive film on a surface of the stainless steel is 1 or greater.

15 Claims, 2 Drawing Sheets

Prior Art

STAINLESS STEEL FOR SOLID POLYMER FUEL CELL SEPARATOR AND SOLID POLYMER TYPEFUEL CELL USING THE STAINLESS STEEL

This application is the United States national phase application of International Application PCT/JP2004/008401 filed Jun. 9, 2004.

TECHNICAL FIELD

This disclosure relates to a stainless steel for a proton-exchange membrane fuel cell (or solid-polymer fuel cell) separator having high durability and a low contact resistance and to a proton-exchange membrane fuel cell using the same.

BACKGROUND ART

In recent years, from the viewpoint of the global environmental conservation, the development has been progressed for fuel cells of the type that has high electric power generation efficiency and that do not emitting $CO_2$. Fuel cells of this type generate electricity by causing the reaction between $H_2$ and $O_2$. Depending on the type of electrolyte, the fuel cells under development are classified by the type of electrolyte into, for example, phosphoric acid type fuel cells, molten carbonate fuel cells, solid oxide fuel cells, alkaline type fuel cells, and proton-exchange membrane fuel cells.

Of these cells, compared with other fuel cells, a proton-exchange membrane fuel cell has the following advantages:

(a) The fuel cell has an electric power generation temperature of 80° C.; that is the cell is capable of generating electricity at a significantly low temperature;

(b) The mainbody of the fuel cell can be formed to be light and compact; and (c) The fuel cell can start up in a short time.

The proton-exchange membrane fuel cell is, therefore, one of today's most attractive fuel cells that are appreciated for use as electric vehicle on-board power sources, home-use stationary power generators, and portable compact power generators.

A proton-exchange membrane fuel cell of this type generates electricity from hydrogen and oxygen through polymer membranes. As shown in FIG. 1, the cell is structured such that a membrane-electrode assembly 1 is clamped between gas diffusion layers 2 and 3 (carbon paper, for example) and further between separators 4 and 5 to form to be a single constitutional element (so-called a "unit cell"), wherein electricity force is generated between the separators 4 and 5.

The membrane-electrode assembly 1 is called "MEA (or, membrane-electrode assembly) that is formed by integration of a polymer membrane and an electrode material such as a carbon black carrying a platinum-based catalyst on obverse and reverse surfaces thereof and have a thickness of from several tens of micrometers (μm) to several hundreds of micrometers (μm). Many alternative cases can be seen where the gas diffusion layers 2 and 3 are integrated with the membrane-electrode assembly 1.

In the case of adaptation of such the proton-exchange membrane fuel cell for the use as described above, the fuel cell is used in the form of a fuel cell stack that is formed by series connecting several tens to several hundreds of unit cells as described above.

The separator 4, 5 is required to have functionalities as (A) A barrier wall to play the role of separating between unit cells;

(B) A conductor for carrying generated electrons;

(C) An airflow channel or hydrogen flow channel along which $O_2$ (i.e., air) or $H_2$ flows; and (D) A discharge channel along which generated water, gas and the like flows.

Further, for the separators 4 and 5, separators having high properties such as high durability and electrical conductivity are required to be used for practical using of the proton-exchange membrane fuel cell.

Regarding the durability (i.e., output voltage fall withstanding property), when used as an electric-vehicle on-board power source, the fuel cell is contemplated to have a durability time of about 5000 hours. As an alternative case where the fuel cell is used as, for example, a home-use stationary power generator, the durability time is contemplated to have about 40000 hours. As such, the separator 4, 5 is required to have properties such as corrosion resistance sufficient to be durable against the long-time power generation.

Regarding the electrical conductivity, the contact resistance between the separator 4, 5 and the gas diffusion layer 2, 3 is desired to be as low as possible. A reason is that an increase of the contact resistance between the separator 4, 5 and the gas diffusion layer 2, 3 causes a reduction of the electric power generation efficiency of the proton-exchange membrane fuel cell. That is, as the contact resistance is lower, the electrical conductivity is higher.

Hitherto, a proton-exchange membrane fuel cell using graphite for a separator 4, 5 has been put into practical use. The separator 4, 5 formed of the graphite has advantages of having a relatively low contact resistance and not causing corrosion. On the other hand, however, the separator is easily damaged by shock. In addition, the separator has a disadvantage of increasing the processing costs for forming airflow channels 6 and hydrogen channels 7. These disadvantages of the separator 4, 5 formed of the graphite causes disturbance against popularization of proton-exchange membrane fuel cells.

As such, attempts have been made to apply metallic materials in lieu of the graphite as the material of the separator 4, 5. Particularly, various studies and approaches have been made to implement practical use of separators 4, 5 using stainless steels as materials.

For example, Japanese Unexamined Patent Application Publication No. 8-180883 discloses a technique using metal, such as stainless steel that readily forms a passive film. However, the formation of the passive film causes an increase in the contact resistance, leading to a decrease in the electric power generation efficiency. As such, problems have been pointed out regarding the matters in which the metallic materials have, for example, high contact resistances and low corrosion resistance in comparison with carbon materials such as graphite.

In addition, attempts have been made such that stainless steels not subjected to surface treatment are used as they are for separators. For example, Japanese Unexamined Patent Application Publications No. 2000-239806 and No. 2000-294256 each discloses a separator-use ferritic stainless steel formed such that Cu and Ni are positively added, impurity elements such as S, P, and N are then reduced, and C+N≤0.03 mass % and 10.5 mass %≤Cr+3×Mo≤43 mass % are satisfied. In addition, Japanese Unexamined Patent Application Publications No. 2000-265248 and No. 2000-294256 each discloses a separator-use ferritic stainless steel formed such that Cu and Ni are restricted to 0.2 mass % or less thereby to inhibit dissolution of metallic ions, impurity elements such as S, P, and N are then reduced, and C+N≤0.03 mass % and 10.5 mass %≤Cr+3×Mo≤43 mass % are satisfied.

Any of the inventions described above is based on the following idea. The composition of the stainless steel are controlled to the predetermined range to strengthen the passive film, whereby the stainless steel is not subjected to the surface treatment and is used as it is for reducing deterioration due to dissolved metallic ions in the catalytic activity of the electrode-carrying catalyst, thereby to restrain the increase in contact resistance with the electrode due to corrosion products. Thus, the stainless steel is not of the type that reduces the contact resistance itself of the stainless steel. Neither is a stainless steel of the type that enables securing the durability (i.e., output-voltage withstanding property) sufficient to withstand electric power generation over several tens of thousands of hours.

In addition, Japanese Unexamined Patent Application Publication No. 10-228914 discloses techniques enabling securing of high output in the manner that gold plating is applied to the surface of separators of, for example, a SUS 304 metallic material, thereby to reduce the contact resistance. However, with thin gold plating being performed, it is difficult prevent pinholes; and in contrast, with thick gold plating being performed, there remains a cost problem pending resolution.

Further, Japanese Unexamined Patent Application Publication No. 2000-277133 discloses techniques of obtaining separators improved in electrical conductivity in the manner that carbon powder is dispersed on a ferritic stainless steel base material. However, also in the case of using such powder, the surface treatment of the separator requires corresponding costs, still remaining cost problems pending resolution. In addition, a problem is pointed out in that in an event where the surface-treated separator is, for example, damaged during assembly, the corrosion resistance thereof decreases significantly.

Japanese Unexamined Patent Application Publication No. 2003-223904 discloses results of research and investigation of the influence of surface roughness of the surface of stainless steel. In this case, the stainless steel surface roughness is set as: Ra: 0.01 μm to 1 μm; and Ry: 0.01 to 20 μm. However, the contact resistance was found insufficient from the viewpoint of securing higher cell output.

In view of the above-described problems with the conventional techniques, it could be helpful to provide a stainless steel for a proton-exchange membrane fuel cell separator that has a high corrosion resistance and a low contact resistance (i.e., high electrical conductivity) and to provide a proton-exchange membrane fuel cell using the same.

More specifically, it could be helpful to provide a stainless steel for a proton-exchange membrane fuel cell separator and a proton-exchange membrane fuel cell using the same, wherein the proton-exchange membrane fuel cell separator is provided by specifying not only composition of stainless steel being as base material, but also composition of a passive film existing on the surface thereof, thereby to have a low contact resistance, a high electric power generation efficiency, and a high corrosion resistance of the stainless steel itself even without being subjected to a surface treatment.

SUMMARY

We thus provide a stainless steel for a proton-exchange membrane fuel cell separator, having a composition comprising 0.03 mass % or less of C, 16-45 mass % of Cr, 0.03 mass % or less of N, 0.1-5.0 mass % of Mo, wherein a total of the C content and the N content satisfies 0.03 mass % or less; a balance portion is comprised of Fe and unavoidable impurities; with respect to Al, Cr, and Fe contained in a passive film on a surface of the stainless steel an atomic ratio of Cr/Fe is 1 or greater; and an atomic ratio of Al/(Cr+Fe) is less than 0.10.

In addition, we provide a stainless steel for a proton-exchange membrane fuel cell separator, having a composition comprising 0.03 mass % or less of C, 0.03 mass % or less of N, 20-45 mass % of Cr, and 0.1-5.0 mass % of Mo, wherein a total of the C content and the N content satisfies 0.03 mass % or less; a balance portion is comprised of Fe and unavoidable impurities; with respect to Al, Cr, and Fe contained in a passive film on a surface of the stainless steel an atomic ratio of Cr/Fe is 1 or greater, and an atomic ratio of Al/(Cr+Fe) is less than 0.05.

We further provide a stainless steel for a proton-exchange membrane fuel cell separator wherein in addition to the composition, the stainless steel comprises at least one selected from a group of items (1)-(4):
(1) Si: 1.0 mass % or less;
(2) Mn: 1.0 mass % or less;
(3) Al: 0.001-0.2 mass % or less; and
(4) Ti or Nb: 0.01-0.5 mass %; or a total of Ti and Nb: 0.01-0.5 mass %.

In addition, we provide a stainless steel for a proton-exchange membrane fuel cell separator wherein, of oxygens contained in the passive film, an atomic ratio of O(M)/O(H) between an oxygen O(M) present in the state of a metal oxide and an oxygen O(H) present in the state of a metal hydroxide is 0.9 or less.

Further, we provide a stainless steel for a proton-exchange membrane fuel cell separator, wherein the Cr content is 20 to 45 mass %.

We also provide a proton-exchange membrane fuel cell formed to comprise a solid polymer film, an electrode, and a separator, wherein any one of the above-described stainless steels is used for the separator.

REFERENCE NUMERALS

1: membrane-electrode assembly; 2: gas diffusion layer; 3: gas diffusion layer; 4: separator; 5: separator; 6: airflow channel; 7: hydrogen flow channel; 8: test piece; 9: carbon paper; and 10: electrode.

DETAILED DESCRIPTION

From the viewpoints of composition of stainless steels and composition of passive films, we carried out extensive study and research regarding a stainless steel separator that would exhibit high corrosion resistance with contact resistance being restrained to be low. As a result, we discovered that with an Mo-containing high purity ferritic stainless steel being used as a base material, the composition of a passive film being generated on the surface thereof is adjusted, whereby the contact resistance is significantly reduced.

As base materials, we used cold rolled ferritic stainless steels (sheet thickness: 0.5 mm) containing 0.004 mass % C, 0.007 mass % N, 0.1 mass % Si, 0.1 mass % Mn, 30.5 mass % Cr, 1.85 mass % Mo, 0.03 mass % P, and 0.005 mass % S. Some of the base materials were subjected to annealing (950° C., 2 minutes) in the atmosphere and then to #600 wet polishing. Others of the base materials were subjected to annealing (950° C., 2 minutes) in a 75 vol. % of $H_2$+25 vol. % of $N_2$ ambient at a dewpoint of −60° C., whereby materials were prepared with a so-called bright annealing ("BA", hereafter) finish. Further, the base materials were subjected to etching at various temperatures for various time periods by using an acidic solution containing 10 mass % nitric acid, 50 mass % hydrochloric acid, and 1 mass % picric acid, and then to pure-water cleaning and cold-air drying for submittal to contact-resistance measurement. Concurrently, some of the wet-polished samples were subjected to pickling by being immersed in an acid mixture solution (8 mass % nitric acid and 2.5 mass % hydrofluoric acid, at 55° C.) for 300 seconds, and are then subjected to pure-water cleaning and cold-air drying for submittal to the contact-resistance measurement.

Figure 2:
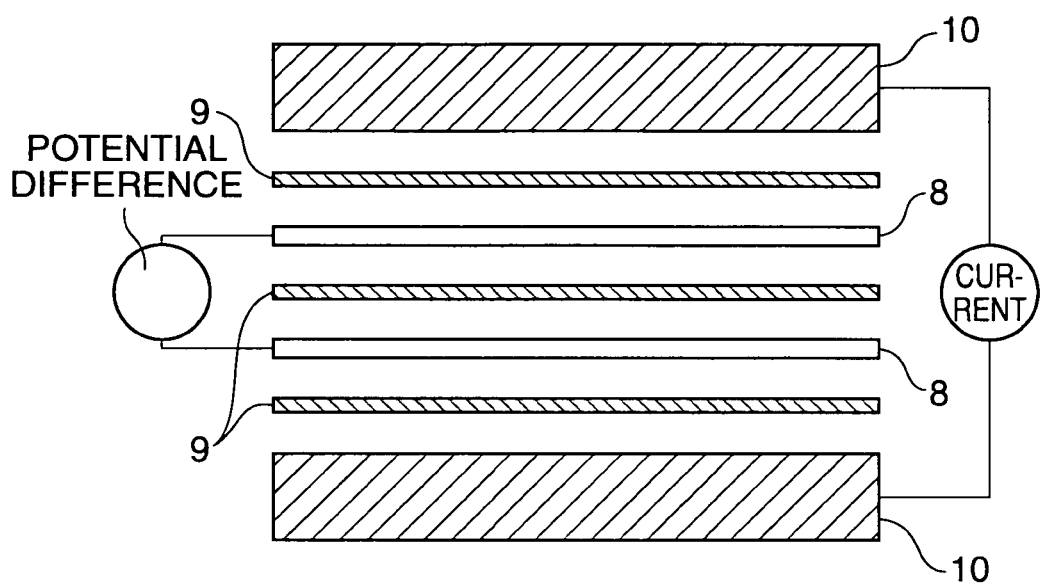
FIG. 2 is a cross sectional view schematically illustrating a test sample used for measurement of contact resistances.

The contact-resistance measurement was carried out in the following manner. Four test specimens (50 mm×50 mm) subjected to etching and pickling under same conditions were prepared. As shown in FIG. 2, two test specimens 8 were placed to be individually alternately sandwiched from both sides by three same-sized carbon paper sheets 9 (Toray Ind. Brand: TGP-H-120) of the same size; electrodes 10 individually formed of gold-plated copper sheets were further placed in contact therewith; and a pressure of 137.2 N/cm$^2$ (or 14 kgf/cm$^2$) per unit area was applied thereon, whereby the resistance between the test specimens 8 were measured. Then, the measurement value was multiplied with the areas of contact planes, and divided by the number of the contact planes (=2), and the value obtained thereby was recorded as a contact resistance.

The respective contact resistance was calculated in accordance with measurement values obtained by performing the measurement six times by changing the pair of test specimens 8, and the average thereof is shown in Table 1.

By way of a referential example, similar measurement was performed on a stainless steel sheet (thickness: 0.3 mm; SUS 304 equivalence) with good plating (thickness: about 0.1 μm) on the surfaces and a graphite sheet (thickness: 5 mm), and contact resistances were calculated. The results are shown in Table 1. In this case, if the resistance value is 10 mΩ·cm$^2$ or lower, no adverse effects are imposed on the fuel cell properties.

In addition, passive films after etching and pickling were measured by a photoelectron spectroscopy, whereby spectral intensities of Fe, Cr, and Al contained in the passive film (i.e., in an oxidized state) were calculated in accordance with a peak separation method. Then, an atomic ratio of Cr/Fe and an atomic ratio of Al/(Cr+Fe) were calculated from the spectral intensities and relative sensitivities of the respective elements (i.e., respective conversion factors between the spectral intensities and the numbers of atoms). The results are shown in Table 1.

Of O (oxygens) contained in the respective passive film, an oxygen O(H) present in the state of a metal hydroxide and oxygen O(M) present in the state of a metal oxide were peak-separated, and an atomic ratio of O(M)/O(H) was calculated from spectral intensities of the oxygens. The results are shown in Table 1.

In the experimentation, a photoelectron-spectroscopy measuring apparatus of a KRATOS brand AXIS-HS was used, whereby the measurement was performed with an Al—Kα ray being used as an excitation source under conditions with an accelerating voltage of 15 kV and a current density of 5 mA. The peak separation of the respective element was carried out by using software accompanying the above-described apparatus.

Clearly from Table 1, the etching of the stainless steel sheet causes reduction in the contact resistance. Particularly, when the Cr/Fe atomic ratio of the passive film is 1 or greater, the contact resistance of the stainless steel sheet becomes 10 mΩ·cm$^2$ or lower. In addition, whereas the contact resistance is reduced even by pickling of the type that is generally applied for stainless-steel pickling, a Cr/Fe ratio is 1 or less and the contact resistance is not reduced even at. In addition, when the O(M)/O(H) atomic ratio is 0.9 or less, the contact resistance is further reduced to 8 mΩ·cm$^2$ or lower.

Further, in the case of the BA-finished stainless steel, although Al is contained in the passive film, the contact resistance is reduced when the Al content is reduced by performing etching. In this event, if the Al/(Cr+Fe) atomic ratio with respect to Cr, Fe, and Al, which are main metal elements constituting the passive film, is 0.10 or less, the contact resistance of the BA-finished stainless steel sheet becomes 10 mΩ·cm$^2$ or lower.

At the contact resistance of 10 mΩ·cm$^2$ or lower, substantially no adverse effects are imposed on the properties of the fuel cell.

To date, there have been cases of investigation conducted on the effects of the Cr/Fe atomic ratio of the passive film. However, knowledge regarding the mechanism having never been disclosed before has been obtained from the our experimentation. The knowledge teaches that adjusting the composition of the passive film enables the contact resistance to be significantly reduced. The mechanism is unclear, but can be envisaged as follows. The contact resistance is envisaged to be reduced for the reason that the increase in Cr/Fe atomic ratio increases the closeness of the passive film and reduces voids or voiding present in the passive film that interfere electrical conduction. In addition, the contact resistance is envisaged to be reduced due the reduction in O(M)/O(H) atomic ratio for the reason that the electrical conductivity of the hydroxide is relatively higher than the oxide. Further, the contact resistance is envisaged to be reduced due to the reduction in the Al content for the reason that the Al oxide having low electrical conductivity is reduced in the passive film.

The following will now describe reasons for restriction of composition of the stainless steel for the separator.

—C: 0.03 Mass % or Less; N: 0.03 Mass % or Less; and C+N: 0.03 Mass % or Less

Either C or N reacts with Cr in the stainless steel to precipitate Cr carbonitrides in grain boundaries, resulting in decrease of corrosion resistance. As such, preferably, the content of the respective component is minimized, and the corrosion resistance is not diminished as long as the contents are maintained in the ranges, that is: C: 0.03 mass % or less; and N: 0.03 mass % or less. When the total content of the C content and the N content (which total hereafter will be referred to as "C+N") exceeds 0.03 mass %, cracking occurring in pressforming extremely increases. For this reason, the C+N content is restricted to 0.03 mass % or less. More preferably, the respective contents are C: 0.015 mass % or less; N: 0.015 mass % or less; and C+N: 0.02 mass % or less.

—Cr: 16-45 Mass %

Cr is an element necessary to secure the corrosion resistance of the stainless steel. At a Cr content of less than 16 mass %, the separator cannot withstand a long-term operation. In addition, a Cr content of less than 16 mass % makes it difficult to decrease the contact resistance to 10 mΩ·cm$^2$ through the adjustment of the Cr/Fe atomic ratio of the passive film to 1 or greater. On the other hand, at a Cr content exceeding 45 mass %, precipitation of a δ phase occurs thereby to diminish the toughness. For these reasons, the Cr content is restricted to 16-45 mass %. In the case that a long-term durability of a tens-of-thousands hour level is required, a higher Cr content is advantageous in terms of corrosion resistance, so that the content is preferably restricted to 20-45 mass %, and more preferably, to 22-35 mass %.

—Mo: 0.1-5.0 Mass %

Mo is an element that has an effect of enhancing pitting/crevice corrosion resistance of the stainless steel. The stainless steel needs to contain Mo of 0.1 mass % or higher to exhibit the effect. On the other hand, the addition of Mo exceeding 5.0 mass % causes a significant increase in the brittleness of the stainless steel, causing difficulty of production. For these reasons, the Mo content is restricted to 0.1-5.0 mass %. A more preferable content is 0.5-3.0 mass %.

It is preferable that the stainless steel for the separator according to the present invention be restricted not only the above-described composition, but also for composition described herebelow.

—Si: 1.0 Mass % or Less

Si is an element that has an effect of deoxidization, and is added in the melting stage of the stainless steel. The content is preferably 0.01 mass % or higher to obtain the effect. However, an excessive content causes hardening of the steel sheet, and concurrently causes decrease in ductility. For these reasons, the upper limit of the Si content is preferably restricted to 1.00 mass %, and more preferably, to 0.01-0.6 mass %.

—Mn: 1.00 Mass % or Less

Mn binds to S and thereby has an effect of decreasing the S content. More specifically, Mn is an element that has an effect of restraining segregation of S at grain boundaries, thereby to prevent cracking of the steel sheet during hot rolling. To obtain the effect, the content of Mn is preferably 0.01 mass % or more. The effect is sufficiently exhibited at the Mn content of 1.0 mass % or less. However, it is more preferable that the content be 0.001-0.8 mass %.

—Al: 0.001-0.2 Mass %

Al is an element that has an effect of deoxidization in the steel making process, and the content of 0.001 mass % or more is necessary to exhibit the effect. However, addition of an amount exceeding 0.2 mass % causes saturation of the effect, only leading to a cost increase. For these reasons, the content is preferably restricted to 0.001-0.2 mass %.

Ti: 0.01-0.5 Mass %; or Nb: 0.01-0.5 Mass %; or Total of Ti and Nb: 0.01-0.5 Mass %

Ti and Nb cause C and N in the stainless steel to be fixed as carbonitrides, thereby offering an effect improving press-formability of the steel sheet. In the case of addition of Ti or Nb under the condition where the C content and the N content satisfy the above-mentioned ranges, the effect is exhibited when the Ti content is 0.01 mass % or more or the Nb content is 0.01 mass % or more. In addition, in the case of addition of Ti and Nb, the effect is exhibited when the total content of Ti and Nb is 0.01 mass % or more. On the other hand, in the case of addition of Ti or Nb, the effect is saturated when the Ti content exceeds 0.5 mass % or the Nb content exceeds 0.5 mass %. In addition, in the case of addition of Ti and Nb, the effect is saturated when the total content of Ti and Nb exceeds 0.5 mass. For these reasons, in the case of addition of Ti or Nb, Ti is preferably contained in an amount of 0.01-0.5 mass % or Nb is preferably contained in an amount of 0.01-0.5 mass %; and in the case of addition of Ti and Nb, the Ti and Nb are preferably contained in the total amount of 0.01-0.5 mass %.

In addition to the elements described above, Ca, Mg, REM (or, rear earth metal), and B may each be added in an amount of 0.1 mass % or less, or 1 mass % or less of Ni may be added to improve hot workability of the stainless steel being used as the base material of the separator. In addition, Ag in an amount of 1 mass % or less and Cu in an amount of 5 mass % or less may be added to decrease the contact resistance, and further, V may be added in an amount of 0.05 mass % to cause Ag to be finely dispersed.

Other elements are balance Fe and unavoidable impurities.

Meanwhile, the steel sheets are ferritic stainless steel made of a ferrite structure composed of the above-described compositional ranges.

Properties and/or characteristics that the stainless steel for the separator should own will now be described herebelow.

—Cr/Fe Atomic Ratio of Passive film on Stainless Steel Surface: 1 or Greater

Although the passive film has a thickness of at most several nanometers (nm), the film is inferior in electrical conductivity to metal, so that cases can take place where the contact resistance is increased depending on the composition of the film. The electrical conductivity of the passive film is variable depending on the composition of the film. As such, the Cr/Fe ratio to be calculated from the Cr content and Fe content of the passive film needs to be increased in order to increase the electrical conductivity of the passive film and to thereby reduce the contact resistance. More specifically, as described in conjunction with the experimentation results, the Cr/Fe atomic ratio needs to be restricted to 1 or greater in order to gain the contact resistance of 10 m$\Omega \cdot$cm$^2$ or lower.

—O(M)/O(H) Atomic Ratio of Passive film on Stainless Steel Surface: 0.9 or Less

The binding state, as well, of O (oxygen) contained in the passive film is an important factor for decreasing the contact resistance. Reducing the O(M)/O(H) atomic ratio between the oxygen (i.e., O(M)) present in the state of the metal oxide and the oxygen (i.e., O(H)) present in the state of the metal hydroxide is effective to reduce the contact resistance. As described in conjunction with the experimentation results, at the O(M)/O(H) atomic ratio of 0.9 or less, the contact resistance of 8 m$\Omega \cdot$cm$^2$ can be gained.

—Al/(Cr+Fe) Atomic Ratio of Passive film on Stainless Steel Surface: Less Than 0.10

Inclusion of Al oxide in the passive film increases the contact resistance. In comparison to, for example, a stainless steel with a pickled finish or polished finish, a stainless steel sheet with bright annealing finish ("BA finish", hereafter) has a passive film containing a larger amount of Al. Accordingly, the Al amount contained in the passive film needs to be reduced to reduce the contact resistance of the stainless steel sheet with the BA finish. As described in conjunction with the experimentation results, at the Al/(Cr+Fe) atomic ratio of less than 0.10 as well, the contact resistance of 10 m$\Omega \cdot$cm$^2$ or lower can be gained.

More preferably, the Al/(Cr+Fe) atomic ratio is restricted to lower than 0.05 in order to reduce the contact resistance to 8 m$\Omega \cdot$cm$^2$ or lower.

A preferred manufacturing method of our steel will now be described here. Conditions of manufacturing our steel are not specifically limited, but a general manufacturing method for ferritic stainless steels can be used. For example, preferably, respective steel is produced in such a manner that refining is conducted using a converter, and secondary refining is conducted in accordance with a strongly stirred vacuum-oxygen-decarburization (SS-VOD) process. As a casting process, a continuous casting process is preferable from the view points of productivity and quality. A respective slab produced by casing is heated to, for example, 1000-1250° C., and is hot rolled into a hot-rolled stainless sheet of a desired thickness. Preferably, after having undergoing hot-rolled-sheet annealing at 800-1150° C. and hence pickling, the hot-rolled stainless sheet is further subjected to a step of cold rolling to be rolled to a predetermined product thickness; or alternatively, the cold-rolled sheet is further subjected to cold-rolled-sheet annealing at 800-1150° C. or is further subjected to pickling, thereby being formed into the product steel. For the sake of productivity, two or more operations of cold rolling inclusive of inter-operation annealing may be performed by necessity in the above-described step of cold rolling. A total rolling-reduction rate in the step of cold rolling including one or two operations of cold rolling is set to 60% or higher, preferably 70% or higher. In addition, depending on the usage, low reduction temper rolling (such as skin pass rolling) moderate skin pass rolling is applied after cold-rolling and annealing. After a gas flow channel is formed by pressforming, the stainless steel sheet having thus been produced is preferably subjected to a process for adjustment of the passive film, thereby to be used as a separator.

A process such as acid-using etching, immersion into an acidic solution, or electrolytic etching can be used to adjust the Cr content, Fe content, Al content, and bound state of O (oxygen) of the passive film.

In many cases of stainless-steel manufacturing processes, descaling is performed in a so-called pickling step by using the process of immersion into various acids or an acid mixture or electrolytic process. In addition, various passivation processes including pickling for enhancing corrosion resistance are known. For enhancing both the corrosion resistance and electrical conductivity, however, a solution totally different from a solution used in ordinary pickling should be used to adjust Cr content, Fe content, Al content, and binding state of O (oxygen) of the passive film.

In the processing of a high Cr stainless steel by using a nitric acid+hydrochloric acid solution, the Cr/Fe atomic ratio was increased and O(M)/O(H) was decreased and favorable results could be gained when an acidic solution having a 2-10 times higher concentration of hydrochloric with respect to the concentration of nitric acid was used. In this case, it is preferable to perform the processing by using the acidic solution to which a picric acid of 0.5-1.0 mass % is further added. Thereby, the effects of the processing can be gained in a short time.

In addition, in the case of a nitric acid+hydrofluoric acid solution, favorable results could be gained with an acidic solution having a 1.5 times higher concentration of the hydrofluoric acid with respect to the concentration of the nitric acid. In the case of each of the nitric acid+hydrochloric acid solution and the nitric acid+hydrofluoric acid solution, the preferred temperature of a acidic solution is 45° C. or higher, and the processing time can be reduced to be shorter as the respective temperature is higher. However, processing liquids usable in the processing are not limited to those as exemplified above. In the event of the processing according to the immersion process, the condition may be selected in regard to, for example, the respective acid type, composition, temperature of the acidic solution and the processing time depending upon, for example, the composition and the surface finish of the base-material stainless steel. In the event of the processing according to the electrolytic process, the condition may be selected in regard to, for example, the composition of the respective electrolyte, electrolytic conditions, the temperature of the acidic solution, and the processing time.

The above-described composition adjustment of the passive film may be performed either before the processing of the stainless steel into the separator or after the processing of the stainless steel into the separator. However, a case can occur in which the passive film is broken down by the processing. As such, the composition adjustment process is preferably performed after the processing of the stainless steel into the separator to maintain the individual Cr/Fe, O(M)/O(H), and Al/(Cr+Fe) atomic ratios in the predetermined ranges.

When a proton-exchange membrane fuel cell is manufactured using the stainless steel separator thus produced, the proton-exchange membrane fuel cell can be manufactured to have low contact resistance, high electric power efficiency, and high corrosion resistance.

EXAMPLES

Example 1

Stainless steels having compositions shown in Table 2 were refined by using a converter in accordance with the strong stirring vacuum-oxygen-decarburization (SS-VOD) process, and were further processed by continuous casting into slabs each having a thickness of 200 mm. The respective slab was heated to 1250° C. and hot rolled into a hot rolled stainless steel sheet having a thickness of 4 mm. The hot-rolled stainless steel sheet was subjected to annealing (at 850-1100° C.) and pickling. Subsequently, the sheet was cold rolled to a thickness of 0.3 mm and was further subjected to annealing (at 850-1100° C.) and pickling, and the sheet was then subjected to temper rolling, thereby formed into a so-called 2B-finished cold rolled stainless steel sheet.

Four 200 mm×200 mm test specimens were cut out from central portions in the sheet-width direction and central portions in the sheet-length direction of the respective cold rolled stainless steel sheet having been produced. Four test specimens having been cut out from each of cold rolled stainless steel sheets of Steel Nos. 1-9 were pressformed into separators each having a predetermined shape. Thereafter, some of the separators of each Steel No. were each subjected to a composition adjustment process of the passive film, thereby to adjust the Cr/Fe atomic ratio. At this stage, when performing composition adjustment process of the passive film, the following solution was used. The solution is A: solution containing 10 mass % nitric acid, 50 mass % hydrochloric acid, and 1 mass % picric acid (50° C., 120 seconds); or B solution containing 5 mass % nitric acid and 20 mass % hydrofluoric acid (50° C., 300 seconds). Test specimens of Steel Nos. 5 and 6 were each subjected to pickling using an acid mixture (pickling 1:8 mass % nitric acid+2.5 mass % hydrofluoric acid, 55° C., 300 seconds; pickling 2:5 mass % nitric acid+3 mass % hydrofluoric acid, 40° C., 600 seconds).

In addition, in a case where the composition adjustment process of the passive film was not performed, the Cr/Fe, O(M)/O(H), and Al/(Cr+Fe) atomic ratios were measured after pressforming. In a case where the composition adjustment process of the passive film was performed, the above-described atomic ratios were measured after pressforming and the composition adjustment process of the passive film. In each of the cases, the atomic ratios were measured in the same method as in the above-described experimentation (Table 1), and were calculated in the peak separation method.

Further, in the same method as in the above-described experimentation (Table 1 and FIG. 2), contact resistances were measured, and the values of the contact resistances were gained.

Figure 1:
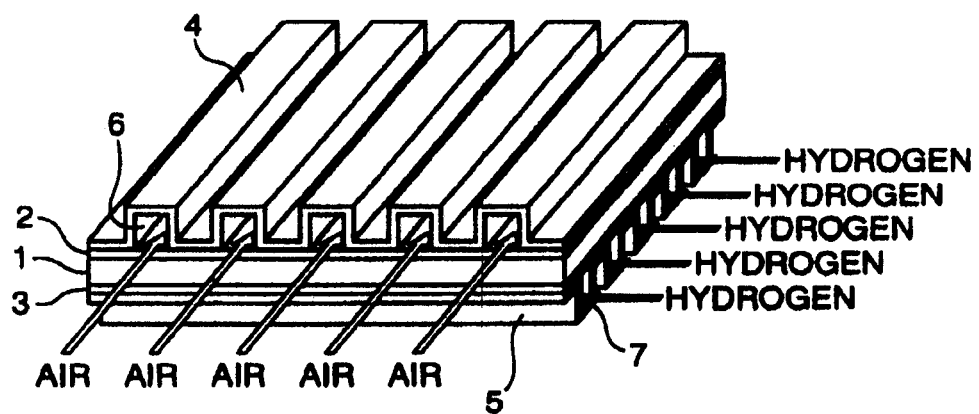
FIG. 1 is a perspective view schematically illustrating an exemplary proton-exchange membrane fuel cell.

Individual electric power generation performance were investigated by using the separators thus subjected to the composition adjustment process of the passive film and the separators not subjected to the composition adjustment process. For evaluation of the electric power generation performance, a unit cell having the shape as shown in FIG. 1 was prepared by using a membrane-electrode assembly 1 (brand of Electrochem Inc.: FC50-MEA) that is integral unit of a polymer membrane, electrodes, and gas diffusion layers 2 and 3 and that has an effective area of 50 cm². An airflow channel 6 and a hydrogen flow channel 7 were each formed into to rectangular of a height of 1 mm and a width of 2 mm, and totally 17 rows each of the channels were disposed. Air was flowed to the cathode side and an ultra-high purity hydrogen (purity: 99.9999 vol. %) was flowed to the anode side after having been humidified by a bubbler maintained at 80±1° C. Thereby, output voltages at current densities of 0.4 A/cm² (condition 1) and 0.7 A/cm² (condition 2) were measured.

In addition, after continuous operation for 2000 hours under the conditions of 0.4 and 0.7 A/cm², and the output voltages under the conditions 1 and 2 were measured. During the time period of the electricity generation of a main body of the unit cell was maintained at 80±1° C. The components such as the membrane-electrode assembly 1 and the carbon paper sheets 9 were replaced with new ones each time the test piece was changed.

By way of referential examples, output voltages at the output current densities of 0.4 and 0.7 A/cm² were measured by using separators plated with gold (thickness: about 0.1 μm) on the individual surfaces thereof after stainless steel sheets (SUS 304 equivalence) were formed into the same shapes as those of Steel Nos. 1-9, and by using separators wherein 17 rows of grooves each with a width of 2 mm and a height of 2 mm were disposed at a spacing of 2 mm on one side of a 3-mm thick graphite plate. The measuring method is the same as that for the Steel Nos. 1-9.

The results of the above are shown in Table 3.

Clearly in FIG. 3, unit cells using a separator for which the processing was performed using the liquid A or B on stainless steels satisfying the compositional ranges of the present invention (specifically, Steel Nos. 3-6 and 9), and the Cr/Fe atomic ratio was set to 1 or greater by adjusting the composition of the passive film were each found to be as follows. The contact resistance is low, the initial output voltage, the output voltage after the passage of 2000 hours, equivalent to those of, for example, a gold-plated separator or a separator of a graphite plate can be gained. Thus, the respective unit cell can sufficiently withstand practical use.

In addition, respective unit cell using a separator with an O(M)/O(H) atomic ratio of 0.9 or less was found to be such that the performance thereof is further improved, and the initial output voltage, the output voltage after the passage of 2000 hours, equivalent to those of, for example, the gold-plated separator or the separator of the graphite plate can be gained.

However, in the case of any of stainless steels (specifically, Steel Nos. 1, 2, 7, and 8), the initial output voltage and the output voltage after the passage of 2000 hours are lower in comparison to the gold-plated separator or the separator of the graphite plate, regardless of the presence or absence of the composition adjustment process of the passive film.

Even in the case of each of the stainless steels satisfying the compositional ranges of the present invention (specifically, Steel Nos. 3-6 and 9), when the composition adjustment process of the passive film is not performed or when the pickling generally used as pickling of the stainless steel is performed, the Cr/Fe atomic ratio of the passive film is low, and the initial output voltage is lower in comparison to the gold-plated separator or the separator of the graphite plate.

Example 2

The stainless steels used in Example 1 were each cold rolled to a thickness of 0.2 mm, and was further subjected to annealing (900-1000° C., 2 minutes) in ammonia decomposed gases having a dewpoint of −60° C., thereby to form a so-called BA-finished cold rolled stainless steel sheet. A BA film of 2-10 nm is formed through the annealing.

Test specimens were taken in the same manner as in Example 1 from the respective cold rolled stainless steel sheet having been produced, and were pressformed into separators each having a predetermined shape. Further, the Cr/Fe ratio, O(M)/O(H) ratio, and Al/(Cr+Fe) ratio of the passive film of the respective separator were calculated. Further, the contact resistance thereof was measured. For example, the shape of the separator, the forming method, composition adjustment process of the passive film, pickling method, measuring method for the content of the respective element, and contact-resistance measuring method for the respective separator are the same as those in Example 1, so that descriptions thereof are omitted herefrom.

Similarly as in Example 1, the electric power generation performance of the separators were investigated. The results thereof are shown in Table 4.

Clearly in Table 4, also in the cases of respective BA-finished stainless steel sheets, unit cells using a separator for which the processing was performed using the liquid A or B on stainless steels satisfying our compositional ranges (specifically, Steel Nos. 3-6 and 9), and the Cr/Fe atomic ratio was set to 1 or greater and the Al/(Cr+Fe) atomic ratio was set to 0.10 or less by adjusting the composition of the passive film were each found to be as follows. The contact resistance is low, the initial output voltage, the output voltage after the passage of 2000 hours, equivalent to those of, for example, a gold-plated separator or a separator of a graphite plate can be gained. Thus, the respective unit cell can sufficiently withstand practical use.

Respective unit cell using a separator with an O(M)/O(H) atomic ratio of 0.9 or less or a separator with an Al/(Cr+Fe) atomic ratio of less than 0.05 was found to be such that the performance thereof is further improved, and the initial output voltage, the output voltage after the passage of 2000 hours, equivalent to those of, for example, the gold-plated separator or the separator of the graphite plate can be gained.

However, in the case of any of stainless steels not satisfying our compositional ranges (specifically, Steel Nos. 1, 2, 7, and 8), the initial output voltage and the output voltage after the passage of 2000 hours are lower in comparison to the gold-plated separator or the separator of the graphite plate, regardless of the presence or absence of the composition adjustment process of the passive film.

Further, even in the case of each of the stainless steels satisfying our compositional ranges (specifically, Steel Nos. 3-6), when the composition adjustment process of the passive film is not performed or when the pickling generally used as pickling of the stainless steel is performed, the Cr/Fe atomic ratio of the passive film is low, and the initial output voltage is lower in comparison to the gold-plated separator or the separator of the graphite plate.

INDUSTRIAL APPLICABILITY

A stainless steel for a proton-exchange membrane fuel cell separator that has a low contact resistance and a high corrosion resistance can be obtained. For a proton-exchange membrane fuel cell which has used an expensive graphite separator because of durability problems, a low cost stainless steel separator can be provided.

This disclosure is not limited to the proton-exchange membrane fuel cell separator, but can widely be used also as a stainless steel electrical component having electrical conductivity.

TABLE 1

| | Finish | Etching Process Temperature (° C.) | Etching Processing Time (sec.) | Cr/Fe Ratio | Passive film O(M)/O(H) Ratio | Passive film Al/(Cr + Fe) Ratio | Contact Resistance (mΩ/cm$^2$) |
|---|---|---|---|---|---|---|---|
| Stainless Steel Sheets | Polishing | 30 | 60 | 0.48 | 1.84 | 0.01 | 80.1 |
| | | 30 | 120 | 0.60 | 1.68 | 0.02 | 75.3 |
| | | 30 | 300 | 0.78 | 1.55 | 0.01 | 55.6 |
| | | 45 | 60 | 0.95 | 1.21 | 0.02 | 39.1 |
| | | 45 | 120 | 1.08 | 1.15 | <0.01 | 9.8 |
| | | 45 | 300 | 1.20 | 0.97 | <0.01 | 9.2 |
| | | 60 | 60 | 1.28 | 0.91 | <0.01 | 9.1 |
| | | 60 | 120 | 1.65 | 0.62 | <0.01 | 6.3 |
| | | 60 | 300 | 1.76 | 0.58 | <0.01 | 5.2 |
| | | Pickling | | 0.82 | 1.32 | 0.01 | 30.2 |
| | | No Process | | 0.33 | 1.99 | 0.07 | 94.2 |
| | BA | 45 | 60 | 1.85 | 0.87 | 0.10 | 21.5 |
| | | 45 | 120 | 2.20 | 0.95 | 0.08 | 9.5 |
| | | 45 | 300 | 2.63 | 0.97 | 0.06 | 8.3 |
| | | 60 | 60 | 2.01 | 0.88 | 0.06 | 9.3 |
| | | 60 | 120 | 2.42 | 0.74 | 0.04 | 6.1 |
| | | 60 | 300 | 2.55 | 0.54 | <0.01 | 5.0 |
| | | No Process | | 2.88 | 0.75 | 0.61 | 48.6 |
| | Gold Plating: SUS 304 | | | | | | 2.1 |
| | Graphite | | | | | | 3.0 |

TABLE 2

| Steel No. | C | N | C + N | Si | Mn | Al | P | S | Cr | Mo | Nb | Ti | Remarks |
|---|---|---|---|---|---|---|---|---|---|---|---|---|---|
| 1 | 0.0080 | 0.0088 | 0.0168 | 0.21 | 0.31 | 0.011 | 0.024 | 0.006 | 15.2 | 1.75 | — | 0.10 | Comparative Example |
| 2 | 0.0029 | 0.0022 | 0.0051 | 0.22 | 0.21 | 0.014 | 0.019 | 0.006 | 30.2 | 0.03 | 0.24 | — | Comparative Example |
| 3 | 0.0034 | 0.0035 | 0.0069 | 0.20 | 0.17 | 0.015 | 0.020 | 0.003 | 22.3 | 0.40 | 0.31 | — | Inventive Example |
| 4 | 0.0075 | 0.0062 | 0.0137 | 0.10 | 0.25 | 0.008 | 0.022 | 0.008 | 23.1 | 2.14 | 0.32 | — | Inventive Example |
| 5 | 0.0042 | 0.0031 | 0.0073 | 0.25 | 0.22 | 0.004 | 0.019 | 0.004 | 22.9 | 3.05 | — | — | Inventive Example |
| 6 | 0.0051 | 0.0075 | 0.0126 | 0.55 | 0.21 | 0.019 | 0.025 | 0.006 | 31.5 | 1.85 | 0.25 | — | Inventive Example |
| 7 | 0.0420 | 0.0200 | 0.0620 | 0.15 | 0.21 | 0.016 | 0.027 | 0.004 | 29.5 | 2.00 | — | 0.21 | Comparative Example |
| 8 | 0.0210 | 0.0250 | 0.0460 | 0.21 | 0.25 | 0.012 | 0.028 | 0.003 | 29.1 | 2.15 | — | 0.22 | Comparative Example |
| 9 | 0.0083 | 0.0051 | 0.0134 | 0.18 | 0.20 | 0.014 | 0.026 | 0.006 | 29.5 | 1.96 | 0.11 | 0.12 | Inventive Example |
| 10 | 0.0052 | 0.0076 | 0.0128 | 0.30 | 0.18 | 0.015 | 0.023 | 0.005 | 16.5 | 0.95 | 0.16 | — | Inventive Example |

TABLE 3

| | Steel No. | Composition Adjustment Process* | Passive film Cr/Fe Ratio | Passive film O(M)/O(H) Ratio | Passive film Al/(Cr + Fe) Ratio | Contact Resistance (mΩ·cm$^2$) | Output Voltage (V) Initial Time Condition 1 | Output Voltage (V) Initial Time Condition 2 | Output Voltage (V) After 2000 Hours Condition 1 | Output Voltage (V) After 2000 Hours Condition 2 | Remarks |
|---|---|---|---|---|---|---|---|---|---|---|---|
| Stainless Steel Sheets | 1 | None | 0.33 | 1.85 | 0.06 | 58.2 | 0.36 | — | — | — | Comparative Example |
| | | A | 0.88 | 0.99 | <0.01 | 36.9 | 0.56 | 0.32 | 0.21 | — | Comparative Example |
| | | B | 0.71 | 0.87 | <0.01 | 40.8 | 0.51 | 0.33 | — | — | Comparative Example |

TABLE 3-continued

| Steel No. | Composition Adjustment Process* | Cr/Fe Ratio | O(M)/O(H) Ratio | Al/(Cr + Fe) Ratio | Contact Resistance (mΩ·cm²) | Initial Time Condition 1 | Initial Time Condition 2 | After 2000 Hours Condition 1 | After 2000 Hours Condition 2 | Remarks |
|---|---|---|---|---|---|---|---|---|---|---|
| 2 | None | 0.38 | 2.05 | 0.06 | 50.6 | 0.42 | — | — | — | Comparative Example |
|  | A | 1.59 | 0.88 | <0.01 | 7.8 | 0.67 | 0.57 | 0.27 | — | Comparative Example |
|  | B | 1.52 | 0.92 | <0.01 | 8.4 | 0.66 | 0.51 | 0.33 | — | Comparative Example |
| 3 | None | 0.34 | 1.98 | 0.07 | 45.8 | 0.38 | — | — | — | Comparative Example |
|  | A | 1.29 | 0.77 | <0.01 | 7.8 | 0.67 | 0.58 | 0.64 | 0.55 | Inventive Example |
|  | B | 1.04 | 0.95 | <0.01 | 8.8 | 0.66 | 0.50 | 0.63 | 0.47 | Inventive Example |
| 4 | None | 0.38 | 1.87 | 0.05 | 48.6 | 0.36 | — | — | — | Comparative Example |
|  | A | 1.39 | 0.85 | <0.01 | 7.2 | 0.67 | 0.58 | 0.64 | 0.55 | Inventive Example |
|  | B | 1.36 | 0.74 | <0.01 | 7.6 | 0.67 | 0.58 | 0.65 | 0.56 | Inventive Example |
| 5 | None | 0.40 | 1.93 | 0.04 | 55.3 | 0.37 | — | — | — | Comparative Example |
|  | Pickling 1 | 0.85 | 1.15 | 0.02 | 29.5 | 0.60 | 0.40 | — | — | Comparative Example |
|  | Pickling 2 | 0.65 | 1.20 | 0.03 | 33.2 | 0.60 | 0.38 | 0.57 | — | Comparative Example |
|  | A | 1.37 | 0.78 | <0.01 | 6.9 | 0.67 | 0.58 | 0.65 | 0.56 | Inventive Example |
|  | B | 1.26 | 0.90 | <0.01 | 8.0 | 0.66 | 0.54 | 0.65 | 0.50 | Inventive Example |
| 6 | None | 0.48 | 2.12 | 0.07 | 49.2 | 0.44 | — | — | — | Comparative Example |
|  | Pickling 1 | 0.89 | 0.96 | 0.02 | 26.3 | 0.61 | 0.45 | 0.57 | — | Comparative Example |
|  | Pickling 2 | 0.70 | 1.31 | 0.06 | 39.5 | 0.52 | 0.35 | — | — | Comparative Example |
|  | A | 1.75 | 0.59 | <0.01 | 5.5 | 0.68 | 0.59 | 0.66 | 0.57 | Inventive Example |
|  | B | 1.58 | 0.60 | <0.01 | 6.3 | 0.67 | 0.58 | 0.65 | 0.56 | Inventive Example |
| 7 | None | 0.55 | 2.10 | 0.07 | 46.9 | 0.42 | — | — | — | Comparative Example |
|  | A | 1.81 | 0.61 | <0.01 | 5.1 | 0.68 | 0.58 | 0.40 | — | Comparative Example |
|  | B | 1.60 | 0.55 | <0.01 | 5.5 | 0.68 | 0.59 | 0.40 | — | Comparative Example |
| 8 | None | 0.48 | 1.91 | 0.05 | 48.8 | 0.39 | — | — | — | Comparative Example |
|  | A | 1.65 | 0.58 | <0.01 | 6.0 | 0.67 | 0.59 | 0.36 | — | Comparative Example |
|  | B | 1.49 | 0.59 | <0.01 | 6.7 | 0.67 | 0.58 | 0.31 | — | Comparative Example |
| 9 | A | 1.77 | 0.71 | <0.01 | 6.2 | 0.68 | 0.58 | 0.66 | 0.56 | Inventive Example |
| 10 | A | 1.19 | 0.91 | <0.01 | 9.2 | 0.66 | 0.50 | 0.62 | 0.47 | Inventive Example |
| Gold Plating: SUS 304 |  |  |  |  | 2.1 | 0.70 | 0.61 | 0.68 | 0.60 | — |
| Graphite |  |  |  |  | 3.0 | 0.69 | 0.60 | 0.67 | 0.60 | — |

*A: 10 Mass % Nitric Acid, 50 Mass % Hydrochloric Acid + 1 Mass % Picric Acid (50° C., 120 Sec.)
B: 5 Mass % Nitric Acid and 20 Mass % Hydrofluoric Acid (50° C., 300 Sec.)
—: Not Measured

TABLE 4

| | Steel No. | Composition Adjustment Process* | Passive film Cr/Fe Ratio | O(M)/O(H) Ratio | Al/(Cr+Fe) Ratio | Contact Resistance (mΩ·cm²) | Output Voltage (V) Initial Time Condition 1 | Condition 2 | After 2000 Hours Condition 1 | Condition 2 | Remarks |
|---|---|---|---|---|---|---|---|---|---|---|---|
| Stainless Steel Sheets | 1 | None | 0.88 | 0.95 | 0.41 | 60.5 | 0.48 | 0.32 | — | — | Comparative Example |
| | | A | 0.79 | 0.99 | 0.02 | 28.3 | 0.56 | 0.46 | 0.19 | — | Comparative Example |
| | | B | 0.81 | 1.12 | 0.02 | 23.8 | 0.52 | 0.48 | — | 0.14 | Comparative Example |
| | 2 | None | 2.43 | 0.79 | 0.49 | 32.1 | 0.62 | 0.47 | 0.38 | — | Comparative Example |
| | | A | 2.30 | 0.77 | 0.03 | 7.9 | 0.65 | 0.57 | 0.30 | 0.29 | Comparative Example |
| | | B | 1.98 | 0.68 | 0.02 | 7.8 | 0.66 | 0.57 | 0.32 | 0.25 | Comparative Example |
| | 3 | None | 1.43 | 1.08 | 0.44 | 29.6 | 0.62 | 0.47 | 0.60 | 0.44 | Comparative Example |
| | | A | 1.38 | 1.05 | 0.02 | 8.2 | 0.67 | 0.50 | 0.65 | 0.48 | Inventive Example |
| | | B | 1.25 | 0.93 | 0.03 | 8.1 | 0.67 | 0.52 | 0.64 | 0.49 | Inventive Example |
| | 4 | None | 1.60 | 1.19 | 0.39 | 27.3 | 0.63 | 0.47 | 0.61 | 0.45 | Comparative Example |
| | | A | 1.44 | 1.03 | 0.01 | 8.8 | 0.66 | 0.51 | 0.63 | 0.47 | Inventive Example |
| | | B | 1.38 | 0.81 | <0.01 | 7.2 | 0.67 | 0.58 | 0.65 | 0.55 | Inventive Example |
| | 5 | None | 1.52 | 1.11 | 0.37 | 26.8 | 0.62 | 0.46 | 0.60 | 0.44 | Comparative Example |
| | | Pickling 1 | 1.48 | 0.98 | 0.11 | 18.2 | 0.63 | 0.48 | 0.59 | 0.41 | Comparative Example |
| | | Pickling 2 | 1.55 | 1.10 | 0.16 | 24.3 | 0.62 | 0.47 | — | — | Comparative Example |
| | | A | 1.48 | 1.05 | 0.01 | 6.3 | 0.67 | 0.51 | 0.65 | 0.48 | Inventive Example |
| | | B | 1.47 | 0.75 | <0.01 | 6.5 | 0.68 | 0.58 | 0.66 | 0.56 | Inventive Example |
| | 6 | None | 2.81 | 0.80 | 0.62 | 21.2 | 0.63 | 0.46 | 0.61 | 0.43 | Comparative Example |
| | | Pickling 1 | 1.98 | 0.87 | 0.24 | 16.9 | 0.63 | 0.49 | — | — | Comparative Example |
| | | Pickling 2 | 2.21 | 0.76 | 0.33 | 20.2 | 0.61 | 0.48 | 0.58 | 0.43 | Comparative Example |
| | | A | 2.25 | 0.77 | 0.03 | 6.5 | 0.67 | 0.57 | 0.66 | 0.55 | Inventive Example |
| | | B | 2.31 | 0.65 | 0.01 | 5.5 | 0.68 | 0.58 | 0.67 | 0.57 | Inventive Example |
| | 7 | None | 2.59 | 0.78 | 0.58 | 22.9 | 0.63 | 0.46 | 0.43 | — | Comparative Example |
| | | A | 2.11 | 0.68 | 0.02 | 5.9 | 0.67 | 0.58 | 0.41 | 0.27 | Comparative Example |
| | | B | 2.03 | 0.59 | 0.01 | 5.5 | 0.68 | 0.59 | 0.39 | 0.30 | Comparative Example |
| | 8 | None | 2.50 | 0.83 | 0.52 | 33.9 | 0.62 | 0.46 | 0.33 | — | Comparative Example |
| | | A | 2.15 | 0.70 | 0.02 | 6.0 | 0.67 | 0.57 | 0.31 | 0.26 | Comparative Example |
| | | B | 2.22 | 0.62 | 0.02 | 5.8 | 0.67 | 0.58 | 0.30 | 0.24 | Comparative Example |
| | 9 | B | 2.22 | 0.62 | 0.02 | 5.2 | 0.70 | 0.58 | 0.68 | 0.56 | Inventive Example |
| | 10 | A | 1.58 | 0.08 | 0.01 | 9.4 | 0.66 | 0.50 | 0.63 | 0.47 | Inventive Example |
| | Gold Plating: SUS 304 | | | | | 2.1 | 0.70 | 0.61 | 0.68 | 0.60 | — |
| | Graphite | | | | | 3.0 | 0.69 | 0.60 | 0.67 | 0.60 | — |

*A: 10 Mass % Nitric Acid, 50 Mass % Hydrochloric Acid + 1 Mass % Picric Acid (50° C., 120 Sec.)
B: 5 Mass % Nitric Acid and 20 Mass % Hydrofluoric Acid (50° C., 300 Sec.)
—: Not Measured

The invention claimed is:

1. A ferritic stainless steel for a proton-exchange membrane fuel cell separator, having a composition comprising 0.0083 mass % or less of C, 16-45 mass % of Cr, 0.03 mass % or less of N, 0.1-5.0 mass % of Mo, Al: 0.001-0.2 mass %, wherein a total of the C content and the N content satisfies 0.03 mass % or less and no B is present; a balance portion is comprised of Fe and unavoidable impurities with a contact resistance of 10 m$\Omega \cdot$cm$^2$ or lower, and having a passive film on a surface of the stainless steel with an atomic ratio of Cr/Fe which is 1 or greater and an atomic ratio of Al/(Cr+Fe) which is less than 0.10.

2. The ferritic stainless steel according to claim 1, wherein the stainless steel further comprises at least one selected from a group of items (1)-(3):
   (1) Si: 1.0 mass % or less;
   (2) Mn: 1.0 mass % or less; and
   (3) Ti or Nb: 0.01-0.5 mass %; or a total of Ti and Nb: 0.01-0.5 mass %.

3. The ferritic stainless steel according to claim 2, wherein the passive film has an atomic ratio of O(M)/O(H) between an oxygen O(M) present in the state of a metal oxide and an oxygen O(H) present in the state of a metal hydroxide is 0.9 or less.

4. The ferritic stainless steel according to claim 2, wherein the Cr content is 20 to 45 mass %.

5. The ferritic stainless steel according to claim 1, wherein the passive film has an atomic ratio of O(M)/O(H) between an oxygen O(M) present in the state of a metal oxide and an oxygen O(H) present in the state of a metal hydroxide is 0.9 or less.

6. The ferritic stainless steel according to claim 5, wherein the Cr content is 20 to 45 mass %.

7. The ferritic stainless steel according to claim 1, wherein the Cr content is 20 to 45 mass %.

8. A ferritic stainless steel for a proton-exchange membrane fuel cell separator, having a composition comprising 0.0083 mass % or less of C, 0.03 mass % or less of N, 20-45 mass % of Cr, and 0.1-5.0 mass % of Mo, Al: 0.001-0.2 mass %, wherein a total of the C content and the N content satisfies 0.03 mass % or less and no B is present; a balance portion is comprised of Fe and unavoidable impurities with a contact resistance of 10 m$\Omega \cdot$cm$^2$ or lower, and having a passive film on a surface of the stainless steel with an atomic ratio of Cr/Fe which is 1 or greater and an atomic ratio of Al/(Cr+Fe) which is less than 0.05.

9. The ferritic stainless according to claim 8, wherein the stainless steel further comprises at least one selected from a group of items (1)-(3):
   (1) Si: 1.0 mass % or less;
   (2) Mn: 1.0 mass % or less; and
   (3) Ti or Nb: 0.01-0.5 mass %; or a total of Ti and Nb: 0.01-0.5 mass %.

10. The ferritic stainless according to claim 8, wherein the passive film has an atomic ratio of O(M)/O(H) between an oxygen O(M) present in the state of a metal oxide and an oxygen O(H) present in the state of a metal hydroxide is 0.9 or less.

11. The ferritic stainless steel according to claim 9, wherein the passive film has an atomic ratio of O(M)/O(H) between an oxygen O(M) present in the state of a metal oxide and an oxygen O(H) present in the state of a metal hydroxide is 0.9 or less.

12. The ferritic stainless steel according to claim 9, wherein the Cr content is 22 to 35 mass %.

13. The ferritic stainless steel according to claim 10, wherein the Cr content is 22 to 35 mass %.

14. The ferritic stainless steel according to claim 3, wherein the Cr content is 20 to 45 mass %.

15. The ferritic stainless steel according to claim 11, wherein the Cr content is 22 to 35 mass %.

* * * * *